(12) United States Patent
Kruglick

(10) Patent No.: US 9,925,461 B2
(45) Date of Patent: Mar. 27, 2018

(54) CHARACTER MODEL ANIMATION USING STORED RECORDINGS OF PLAYER MOVEMENT INTERFACE DATA

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/477,229

(22) Filed: Apr. 3, 2017

(65) Prior Publication Data

US 2017/0216722 A1    Aug. 3, 2017

Related U.S. Application Data

(63) Continuation of application No. 14/992,042, filed on Jan. 11, 2016, now Pat. No. 9,610,496, which is a continuation of application No. 13/876,160, filed as application No. PCT/US2012/057485 on Sep. 27, 2012, now Pat. No. 9,266,020.

(51) Int. Cl.
*A63F 13/77* (2014.01)
*A63F 13/428* (2014.01)
*A63F 13/213* (2014.01)
*A63F 13/355* (2014.01)
*A63F 13/58* (2014.01)
*A63F 13/65* (2014.01)

(52) U.S. Cl.
CPC .......... *A63F 13/428* (2014.09); *A63F 13/213* (2014.09); *A63F 13/355* (2014.09); *A63F 13/58* (2014.09); *A63F 13/65* (2014.09); *A63F 2300/554* (2013.01); *A63F 2300/6009* (2013.01)

(58) Field of Classification Search
CPC ....... A63F 13/10; A63F 2300/55; A63F 13/77
See application file for complete search history.

(56) References Cited

U.S. PATENT DOCUMENTS

| 7,961,174 | B1 | 6/2011 | Markovic et al. |
| 8,255,795 | B2 | 8/2012 | Saft et al. |
| 8,267,781 | B2 | 9/2012 | Geiss |
| 8,269,834 | B2 | 9/2012 | Albertson et al. |
| 2004/0148273 | A1 | 7/2004 | Allen et al. |
| 2008/0152216 | A1 | 6/2008 | Meadow et al. |

(Continued)

OTHER PUBLICATIONS

"Essential Facts About the Computer and Video Game Industry" accessed at http://www.isfe.eu/sites/isfe.eu/files/attachments/esa_ef_2011.pdf, pp. 1-16 (2011).

(Continued)

*Primary Examiner* — Omkar Deodhar
(74) *Attorney, Agent, or Firm* — Turk IP Law, LLC

(57) ABSTRACT

Technologies are generally described for providing full-motion animation-as-a-service. In some examples, short motion-capture segments may be captured from user motion user interface devices and stored in a database. When a full-motion animation is desired, a start pose and a target pose may be provided, and a multiple-path, multiple-iteration search through the database may be used to assemble the full-motion animation. Motion retargeting may be used to further refine the assembled full-motion animation.

20 Claims, 12 Drawing Sheets

(56) References Cited

U.S. PATENT DOCUMENTS

| | | |
|---|---|---|
| 2008/0169929 A1 | 7/2008 | Albertson et al. |
| 2010/0302257 A1 | 12/2010 | Perez et al. |
| 2010/0309209 A1 | 12/2010 | Hodgins et al. |
| 2011/0248915 A1 | 10/2011 | Lu et al. |
| 2012/0088544 A1 | 4/2012 | Bentley et al. |
| 2012/0233032 A1 | 9/2012 | Calman et al. |

OTHER PUBLICATIONS

"Xbox 360 + Kinect," accessed at https://web.archive.org/web/20120923165700/http://www.xbox.com/en-US/kinect, copyright 2012, accessed on Feb. 22, 2017, pp. 2.

Arikan, O., et al., "Motion synthesis from annotations," In Proceedings of ACM SIGGRAPH, vol. 22, Issue 3, pp. 402-408 (Jul. 2003).

Bonnington, C., "Kinect could make its way to laptops," accessed at https://web.archive.org/web/20120713141323/http://www.cnn.com/2012/01/30/tech/gaming-gadgets/microsoft-kinect-laptops-wired/index.html, updated on Jan. 30, 2012, pp. 2.

Choi, K-J., and Ko, H-S., "On-line motion retargetting," Proceedings. Seventh Pacific Conference on Computer Graphics and Applications, pp. 32-42 (Oct. 5-7, 1999).

Gleicher, M., "Retargetting motion to new characters," Proceedings of the 25th annual conference on Computer graphics and interactive techniques, pp. 33-42 (Apr. 27, 1998).

Gleicher, M., et al., "Snap-Together Motion: Assembling Run-Time Animations," Proceedings of ACM SIGGRAPH on ACM Transactions on Graphics (TOG), vol. 22, Issue 3, pp. 1-8 (Jul. 2003).

Grünvogel, S., et al., "AMOBA: A Database System for Annotating Captured Human Movements," Proceedings of Computer Animation, pp. 98-102 (Jun. 21, 2002).

International Search Report and Written Opinion for International Application No. PCT/US2012/057485 dated Dec. 27, 2012, pp. 12.

Kovar, L., et al., "Motion graphs," ACM Transactions on Graphics (TOG)—Proceedings of the 29th annual conference on Computer graphics and interactive techniques, vol. 21, No. 3, pp. 473-482 (Jul. 2002).

McGlaun, S., "Next Gen Kinect Features Higher Resolution Camera, Reportedly Can Read Lips," accessed at https://web.archive.org/web/20120828185248/http://www.dailytech.com/Next+Gen+Kinect+Features+Higher+Resolution+Camera+Reportedly+Can+Read+Lips/article23389.htm, Nov. 29, 2011, pp. 1.

Morales, C. R., "Development of an XML Web Based Motion Capture Data Warehousing and Translation System for Collaborative Animation Projects," In Proceedings of WSCG 2001 Conference, pp. 1-6 (Feb. 5-9, 2001).

Mukai, T., and Kuriyama, S., "Pose—Timeline for Propagating Motion Edits," Proceedings of the 2009 ACM SIGGRAPH/Eurographics Symposium on Computer Animation, pp. 113-122 (2009).

Shin, H.J., and Lee, J.., "Motion Synthesis and Editing in Low-Dimensional Spaces," Computer Animation and Virtual Worlds, vol. 17, Issues 3-4, pp. 219-227 (Jul. 2006).

Vlachos, M., et al., "Indexing Multi-dimensional Time-series with Support for Multiple Distance Measures," In Proceedings of the Ninth ACM SIGKDD International Conference on Knowledge Discovery and Data Mining, pp. 216-225 (Aug. 24, 2003).

COMPUTER PROGRAM PRODUCT 1200

SIGNAL BEARING MEDIUM 1202

1204 AT LEAST ONE OF

ONE OR MORE INSTRUCTIONS FOR RECEIVING A SEARCH REQUEST WITH START AND END POSITIONS FOR A REQUESTED MOTION;
ONE OR MORE INSTRUCTIONS FOR SEARCHING DATABASE FROM EACH END OF A TARGET MOTION;
ONE OR MORE INSTRUCTIONS FOR IF THE SHORT MOTION SEQUENCES OF THE TARGET MOTION JOIN, ASSEMBLING STEPS OF THE REQUESTED MOTION; AND
ONE OR MORE INSTRUCTIONS FOR IF THE REQUESTED MOTION IS ASSEMBLED, PROVIDING THE ASSEMBLED MOTION TO THE GAME DEVELOPER.

| COMPUTER-READABLE MEDIUM 1206 | RECORDABLE MEDIUM 1208 | COMMUNICATIONS MEDIUM 1210 |

FIG. 12

CHARACTER MODEL ANIMATION USING STORED RECORDINGS OF PLAYER MOVEMENT INTERFACE DATA

CROSS-REFERENCE TO RELATED APPLICATIONS

This application is a continuation under 35 U.S.C. § 120 of U.S. patent application Ser. No. 14/992,042, filed on Jan. 11, 2016, now U.S. Pat. No. 9,610,496, which in turn is a continuation under 35 U.S.C. § 120 of U.S. patent application Ser. No. 13/876,160, filed on Mar. 26, 2013, now U.S. Pat. No. 9,266,020, which in turn is the U.S. National Stage filing under 35 U.S.C. § 371 of International Application No. PCT/US12/57485, filed on Sep. 27, 2012. U.S. patent application Ser. No. 14/992,042, U.S. patent application Ser. No. 13/876,160, and International Application No. PCT/US12/57485 are herein incorporated by reference in their entireties.

BACKGROUND

Unless otherwise indicated herein, the materials described in this section are not prior art to the claims in this application and are not admitted to be prior art by inclusion in this section.

Motion capture may often be used to create realistic animation. Because human motion may be complex, yet inherently familiar to human observers, it may be difficult to produce believable human motion using current model and kinetics-based model-animation techniques. Additionally, a skilled animator may produce 2-5 seconds of animation per character per day, whereas motion capture may provide 15 minutes or more of usable motion per day. However, even 15 minutes per day of motion capture may make it expensive to add broad motion capture usage to media such as video games. Some games may include hundreds of characters, each with dozens of motions. Animating these motions may involve great expense.

In addition, some games or virtual environments with large-scale, immersive worlds may contain hundreds of characters, each having thousands of possible actions, many of which may be dynamically generated based on semi-unique positions and conditions. Animating all of these motions may be cost-prohibitive. Using the same animation for multiple characters and/or motions may be undesirable, because game consumers may easily recognize reused motions. Therefore, unique motions or variations between repeated motions may be desired, which may drive expenses even higher.

The present disclosure generally describes techniques or animating character models using stored recordings of player movement interface data.

According to some examples, a system for providing searchable short motion sequences to game developers includes a communication module and a server. The communication module may be configured to receive captured motion of multiple users through one or more capture devices. The server may be configured to generate searchable quantizations of short motion sequences from the captured motion, combine the searchable quantizations in a database, and render the searchable quantizations available to game developers from the database through searches for building assembled motion.

According to other examples, a method for providing searchable short motion sequences to game developers includes receiving captured motion of multiple users through one or more capture devices, generating searchable quantizations of short motion sequences from the captured motion, combining the searchable quantizations in a database, and rendering the searchable quantizations available to game developers from the database through searches for building assembled motion.

According to further examples, a system for providing assembled motion segments from searchable quantizations of short motion sequences derived from captured motions may include a communication module, a database, and a server. The communication module may be configured to receive search requests from one or more requesters and provide the assembled motion segments to the requesters. The database may be configured to store the quantizations of short motion sequences derived from captured motions of multiple users. The server may be configured to receive start and end positions for a requested motion, search the database from each end of a target motion, assemble steps of the requested motion if the short motion sequences of the target motion join, otherwise search for new points within the target motion, and provide the assembled motion to a requester if the requested motion is assembled.

According to yet farther examples, a method for providing assembled motion segments from searchable quantizations of short motion sequences derived from captured motions may include receiving a search request from a requester, where the search request includes start and end positions for a requested motion, searching a database from each end of a target motion, where the database is configured to store the quantizations of short motion sequences derived from captured motions of multiple users, assembling steps of the requested motion if the short motion sequences of the target motion join, otherwise searching for new points within the target motion, and providing the assembled motion to a requester if the requested motion is assembled.

According to some examples, a computer readable medium may store instructions for providing searchable short motion sequences to game developers. The instructions may include receiving captured motion of multiple users through one or more capture devices, generating searchable quantizations of short motion sequences from the captured motion, combining the searchable quantizations in a database, and rendering the searchable quantizations available to gate developers from the database through searches for building assembled motion.

According to other examples, a computer readable storage medium may store instructions for providing assembled motion segments from searchable quantizations of short motion sequences derived from captured motions. The instructions may include receiving a search request from a requester, where the search request includes start and end positions for a requested motion, searching a database from each end of a target motion, where the database is configured to store the quantizations of short motion sequences derived from captured motions of multiple users, assembling steps of the requested motion if the short motion sequences of the target motion join, otherwise searching for new points within the target motion, and providing the assembled motion to a requester if the requested motion is assembled.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 11 and 12 illustrate block diagrams of example computer program products, all arranged in accordance with at least some embodiments described herein.

DETAILED DESCRIPTION

Figure 1:
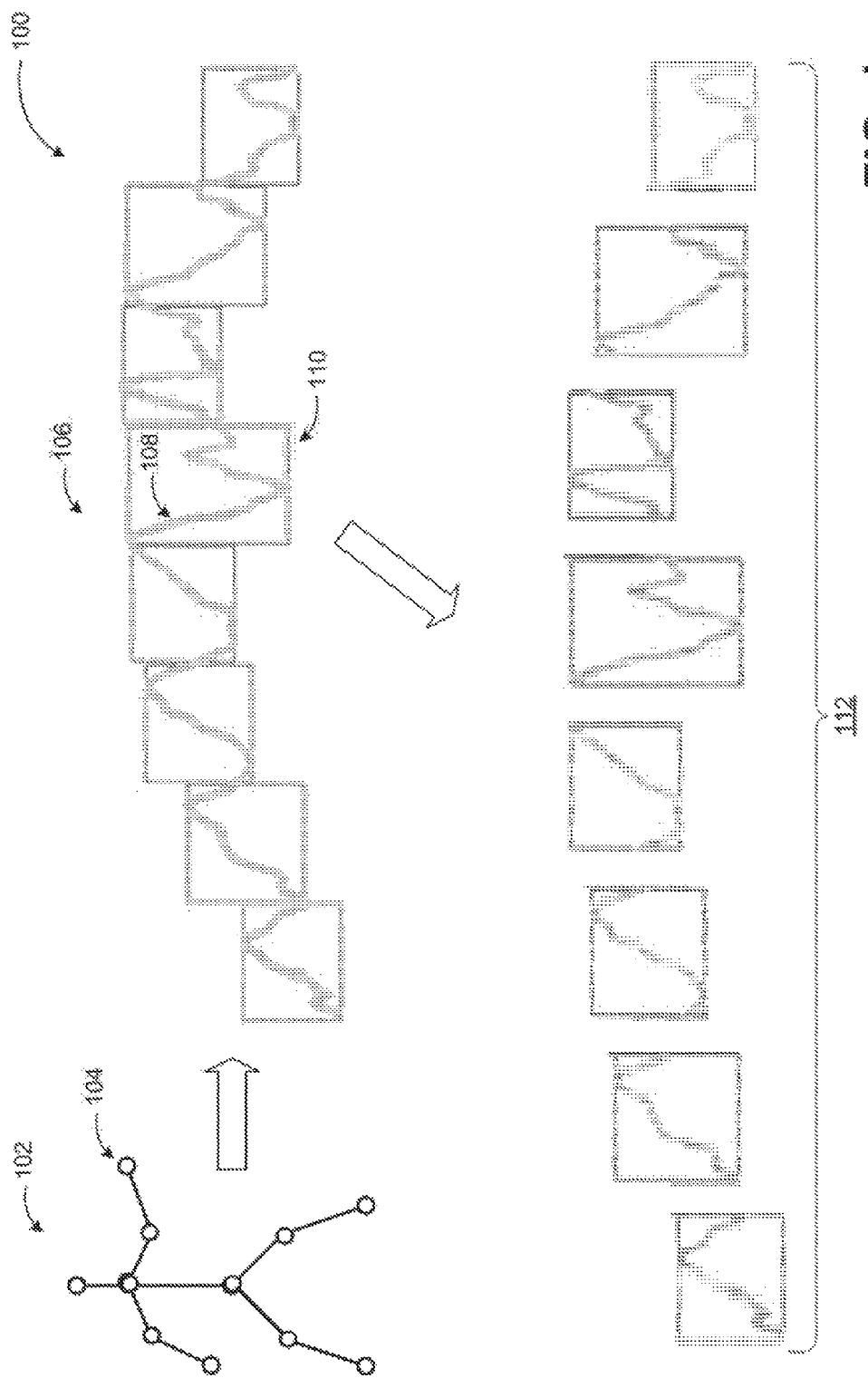
FIG. 1 illustrates an example quantization of a captured motion into short motion segments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing character model animation using stored recordings of player movement interface data.

Briefly stated, technologies are generally described for providing full-motion animation-as-a-service. In some examples, short motion-capture segments may be captured from user motion user interface devices and stored in a database. When a full-motion animation is desired, a start pose and a target pose may be provided, and a multiple-path, multiple-iteration search through the database may be used to assemble the full-motion animation. Motion retargeting may be used to further refine the assembled full-motion animation.

For example, developers of games that use three-dimensional characters, avatars, and items may wish to make character movements seem natural. Physics-based rules, also known as "marionette physics", may be used to generate motions relatively and inexpensively. Unfortunately, motions generated via such rules may seem unnatural to a human observer. Therefore, motion capture may be used to generate movements that are realistic. However, motion capture has its own problems. Movements based on motion capture may be expensive to generate, and also difficult to reuse in a natural manner, because observers may easily recognize repetitive movements as being unnatural.

One potentially cost-effective way to generate motion capture movements may be to combine short motion sequences together. Short motion sequences may be individually unsuitable for animating characters. However, a series of short motion sequences may be combined into a longer motion sequence suitable for animating characters. As networked motion capture devices (e.g., public cameras or home game systems) become more prevalent, significant numbers of short motion sequences may be captured and stored in a cloud environment. The stored short motion sequences or longer motion sequences assembled from the short motion sequences may then be offered to game developers as a service.

FIG. 1 illustrates an example quantization of a captured motion into short motion segments, arranged in accordance with at least some embodiments described herein.

As shown in a diagram 100, a figure model 102 may include a number of tracking points 104. The figure model 102 may represent a human (as reflected in its humanoid form in FIG. 1), or may represent an animal, a robot, or any other entity capable of movement. The tracking points 104 correspond to joints or specific locations on the represented entity, and may be selected such that particular poses (i.e., arrangements or configurations of the entity's various appendages) of the entity may be described by the positions and/or orientations of the tracking points 104. As a result, any movement or motion of the entity may also be described by the trajectories (i.e., changes in position) of the tracking points 104. For example, a motion plot 106 may depict the trajectory of one particular tracking point in the tracking points 104. In some embodiments, the motion plot 106 may include the trajectories of multiple tracking points in the tracking points 104.

The motion plot 106, while depicted in FIG. 1 as a two-dimensional plot, is not so limited. For example, the motion plot 106 may track the motion of tracking points in one, two, or three spatial dimensions. In some embodiments, the motion plot 106 may track the motion of tracking points in one or more spatial dimensions as a function of time. For example, the two-dimensional motion plot 106 shown in FIG. 1 may track the motion of tracking points in a particular spatial direction on a vertical axis, and may track time on a horizontal axis. Similarly, while the tracked trajectories are depicted graphically in the motion plot 106, it should be understood that trajectory information may be tracked with any suitable data format, such as absolute coordinates, relative coordinates, and/or parametric coordinates.

In some embodiments, the motion plot 106 may be quantized into one or more short motion segments 112. A particular short motion segment 110 may contain a portion 108 of the tracked motion data in the motion plot 106. The granularity of the quantization may be based on desired time duration, desired range or extent of motion, orientation, position, timing, velocity, acceleration, or on any other suitable parameter.

Figure 2:
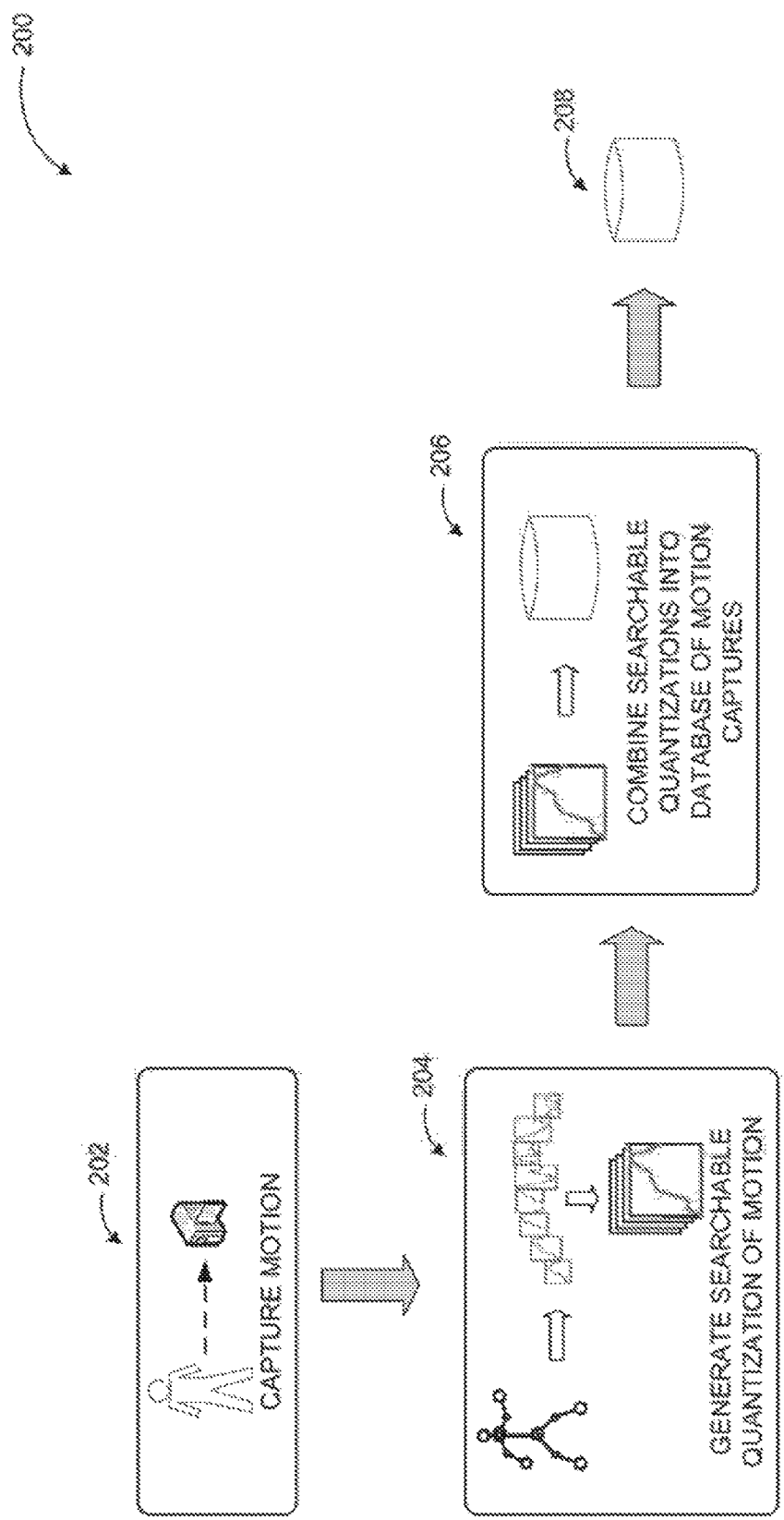
FIG. 2 illustrates components of an example process for generating searchable short motion sequences based on motions captured from multiple users.

FIG. 2 illustrates components of an example process for generating searchable short motion sequences based on motions captured from multiple users, arranged in accordance with at least some embodiments described herein.

As shown in a diagram 200, a process for generating searchable short motion sequences may include a block 202, in which motions may be captured from one or more users. Motions may be captured via any suitable motion capture device, such as a video camera or a motion capture user interface. The motion capture may be performed in a public setting (e.g., an outdoor space, a public thoroughfare, within a store or public establishment) or in a private setting (e.g., in a residence, in an office, or in a workplace). In some embodiments, identifying characteristics may be removed from the captured motion, such that individual users cannot be identified. Subsequently, in a block 204, the captured motion may be processed to generate searchable quantizations of motion, for example as described in FIG. 1. In a block 206, the searchable quantizations may then be used to form a database 208 of motion captures. In some embodiments, the searchable quantizations in the database 208 may be searchable by pose, action, duration, or any other parameter or characteristic of the quantizations of motion. The searchable quantizations may also be searchable by character features, such as size, proportions, weight, inertia, movement style, or any other characteristic associated with a character. In some embodiments, the different searchable quantizations may be filtered to remove or isolate undesirable motion segments from the captured motion. For example, motion segments containing rude or obscene gestures or movements may be undesirable, and therefore be removed or isolated from the database 208.

Figure 3:
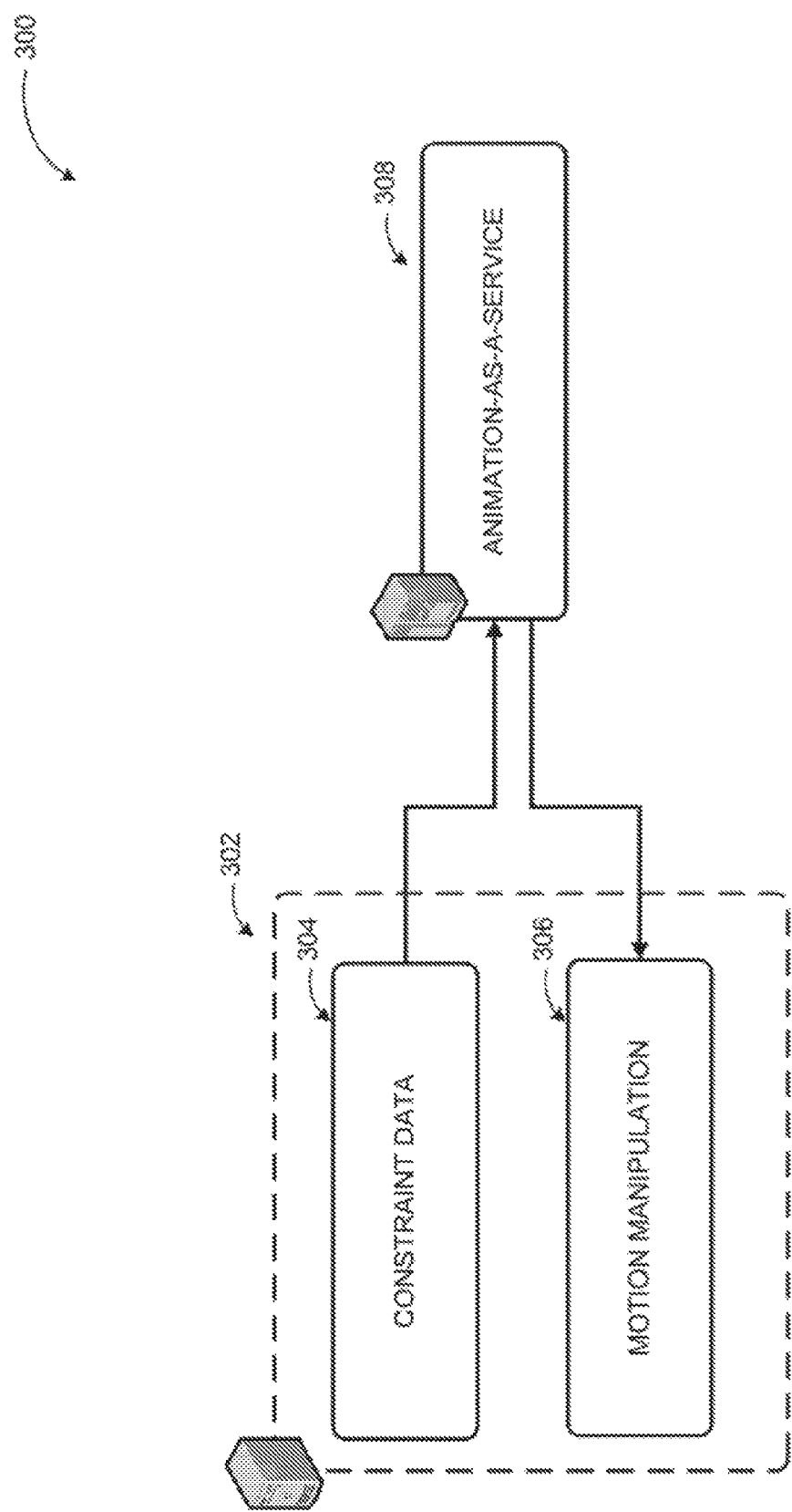
FIG. 3 illustrates a conceptual diagram of providing animated character models using stored recordings of player movement interface data.

FIG. 3 illustrates a conceptual diagram of providing animated character models using stored recordings of player movement interface data, arranged in accordance with at least some embodiments described herein.

As shown in a diagram 300, an entity 302 may wish to obtain a full-motion animation of a character, where the animation has a predefined start pose/position and a predefined end post/position. The predefined positions may be at varying levels of specification or precision, for example some limbs or elements may be weakly specified or unspecified. The entity 302 may be a process executing on a computer or computing device of, for example, a game developer service, a film producing service, or the like. In some embodiments, the entity 302 may also provide other constraints for the animation, such as time duration, desired (or undesired) orientations or trajectories, or any other suitable constraint. The entity 302 may provide this constraint data 304 to an animation service 308 (e.g., an animation-as-a-service "AaaS" provider), for example via an application programming interface (API). The animation service 308 may then use the constraint data 304 and one or more databases of searchable quantizations of motions (e.g., the database 208 in FIG. 2) to create the desired full-motion animation, as described below in further detail in FIG. 4. The completed animation may be provided to the entity 302, which may then perform an additional motion manipulation 306 in order to refine the match between the received animation and the character, also described below in further detail.

In some examples, captured motion may be normalized to an established scale. Such normalization may make searching for short motion sequences easier.

Figure 4:
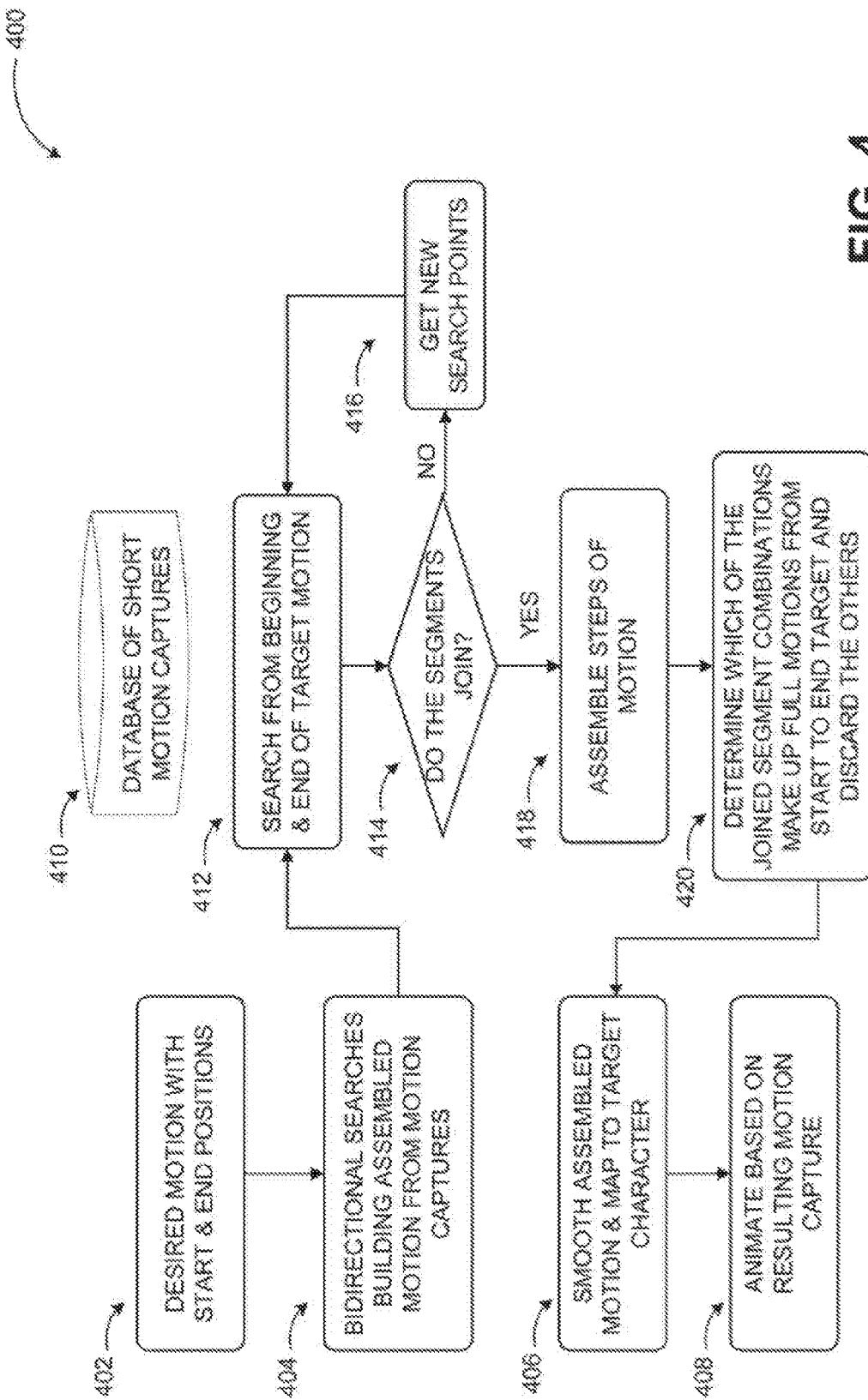
FIG. 4 illustrates an example process of providing assembled motion segments from searchable quantizations of short motion sequences derived from motions captured from multiple users.

FIG. 4 illustrates an example process of providing assembled motion segments from searchable quantizations of short motion sequences derived from motions captured from multiple users, arranged in accordance with at least some embodiments described herein.

As depicted in a diagram 400, a process for providing a full-motion animation may begin with a block 402, in which information about the start and end positions of a requested motion-capture animation may be provided by an entity requesting animation such as a game developer, a film producer, or the like. In some embodiments, the information may include starting and ending positions, poses, orientations, and/or any other information related to the starting and ending states of the desired full-motion animation. As described above, in some embodiments, other constraint information may be provided by the game developer or film producer, such as a desired time duration, desired (or undesired) orientations or trajectories, or any other suitable constraint information.

In a next block 404, the received start and end position information may be used to begin the assembly of the requested full-motion animation by a provider of animation-as-a-service "AaaS" (e.g., animation service 308) or a consolidator 508 with access to one or more databases 410 of short motion captures. Specifically, multiple-path, multiple-iteration bidirectional searches based on the start and end position information (described below) may be performed on the databases 410 of short motion segments. In some embodiments, the short motion segments include searchable quantizations of motion sequences captured from multiple users, as described above in relation to FIGS. 1 and 2.

In a block 412, searches for short motion segments in the database 410 that match the desired start and end positions may be performed by the provider of AaaS or the consolidator. For example, positions may be represented by letters (i.e., "A" or "B") and motion segments are represented by sequences of letters (i.e., "ADFYE"). Furthermore, the desired start position may be "K" and the desired end position may be "V". A search may be performed for a short motion segment that includes the desired start position "K" but does not end with it (i.e., "JKB" satisfies this condition but "JBK" does not). Another search may be performed for a short motion segment that includes the desired end position "V" but does not start with it (i.e., "HVL" satisfies this condition but "VHL" does not). In some embodiments, the searches may also be constrained by other parameters. For example, if the requested full-motion animation is for a character with particular character features (e.g., weight, size, inertia, movement style, etc.), the searches may be filtered to remove results that do not have those desired character features.

Once segments have been found that satisfy the desired start and end positions, in a block 414 the AaaS provider or the consolidator may determine if the segments join together. For example, using the scenario described above, segment "JKBX" satisfies the start position criterion, and segment "OHVL" satisfies the end position criterion. However, segment "JKBX" may not be able to join with the segment "OHVL", because they do not share positions that match (i.e., none of the positions in "JKBX" after the required starting position of "K", which includes "B" and "X", match positions in "OHVL" before the required ending position of "V", which includes "O" and "H"). If it is determined that the found segments do not join, then in a block 416 the AaaS provider or the consolidator may set non-matching joinable positions of the previously-found segments as new desired start and end positions in a block 416. For example, "B" and "X" may be set as the new desired start positions, and "O" and "H" set as the new desired end positions. The process may revert back to the block 412, where a new iteration of the search is performed as described above. In this case, the previously-found segments (e.g., "JKBX" and "OHVL") may be retained for later use, when sufficient segments that join together have been found to create the entire requested full-motion animation.

If the previous example is followed, the new desired start position may be either "B" or "X", and the new end position may be either "O" or "H". When a new search is performed in block 412 with these new positions, two new segments, "ABCDE" (which satisfies one of the new desired start positions) and "DEFGH" (which satisfies one of the new desired end positions), may be found according to an example scenario. In a subsequent block 414, the AaaS provider or the consolidator may determine whether the two new segments join. In this case, both "D" and "E" may provide potential joining positions. Therefore, it may be determined that the two segments do join.

After determining that the two segments "ABCDE" and "DEFGH" join, in block 418 the AaaS provider or the consolidator may assemble the two segments together. In some embodiments, the segments may be shortened to remove portions before the desired start position and after the desired end position. In this example, "B" is the desired start position, so the position "A" may be removed from the first segment. "H" is the desired end position, so no change may be made to the second segment. The shortened segments may then be subsequently joined to form a combined segment ("BCDEFGH" in the case above). In some embodiments, the segments may first be joined before portions are removed. For example, the first and second segments may be joined to form "ABCDEFGH" before "A" is removed. In some examples, multiple starts and ends may be maintained based on multiple results of earlier searches.

In a block 418 the AaaS provider or the consolidator may also join any previously found segments to a newly-combined segment. For example, the start and end positions of the segment "BCDEFGH" were originally derived from the later part of segment "JKBX" and the beginning part of segment "OHVL". In this case, the segments may be further combined (and portions removed) to form a combined segment "KBCDEFGHV", which also has the originally requested start and end positions ("K" and "V", respectively).

Subsequently, in a block 420, the AaaS provider or the consolidator may determine which of the joined segment combinations make up full motions from start to end target motion and discard the others. The process may move from the block 420 to the block 406, where the assembled full-motion animation may be manipulated and mapped to a target character by the AaaS provider or the consolidator. As mentioned above, multiple starts and ends may be maintained based on multiple results of earlier searches. Alternatively, a separate entity such as the requesting game developer or film producer may perform the smoothing and mapping. In some embodiments, motion retargeting may be used to perform the animation smoothing and mapping. Motion retargeting may allow motions to be customized based on certain properties of the target model or entity in order to make the motions seem natural. For example, two entities having different dimensions (e.g., size, height, weight, etc.) may naturally perform motions differently. Motion retargeting may then be used to customize the same full-motion animation in one way for one entity and in another way for the second entity such that the animation appears natural for both entities. In cases where the assembled full-motion animation includes short motion segments captured from entities having different dimensions, motion retargeting may be used on the individual segments to make the entire assembled animation appear consistent. In some embodiments, short motion sequences stored in the database 410 may include associated dimensions for the user from which the short motion sequence was captured in order to facilitate the use of motion retargeting.

In some embodiments, a convolution technique Fast Fourier Transform or Schoenhage-Strassen algorithm) may be used to smooth the assembled animation, in the block 406 and/or in the block 418. For example, multiple overlapping motion segments may be convolved together in the block 418 in lieu of or in addition to the joining process described above.

While in the above example the animation assembly process resulted in a single solution, in other cases the assembly process may be configured to result in multiple, different full-motion animations that all satisfy the requester requirements. In such cases, the full-motion animation provided to the requester may be selected randomly or probabilistically. Finally, in a block 408, the game developer or the film producer may use the full-motion animation to animate the target character.

Figure 5:
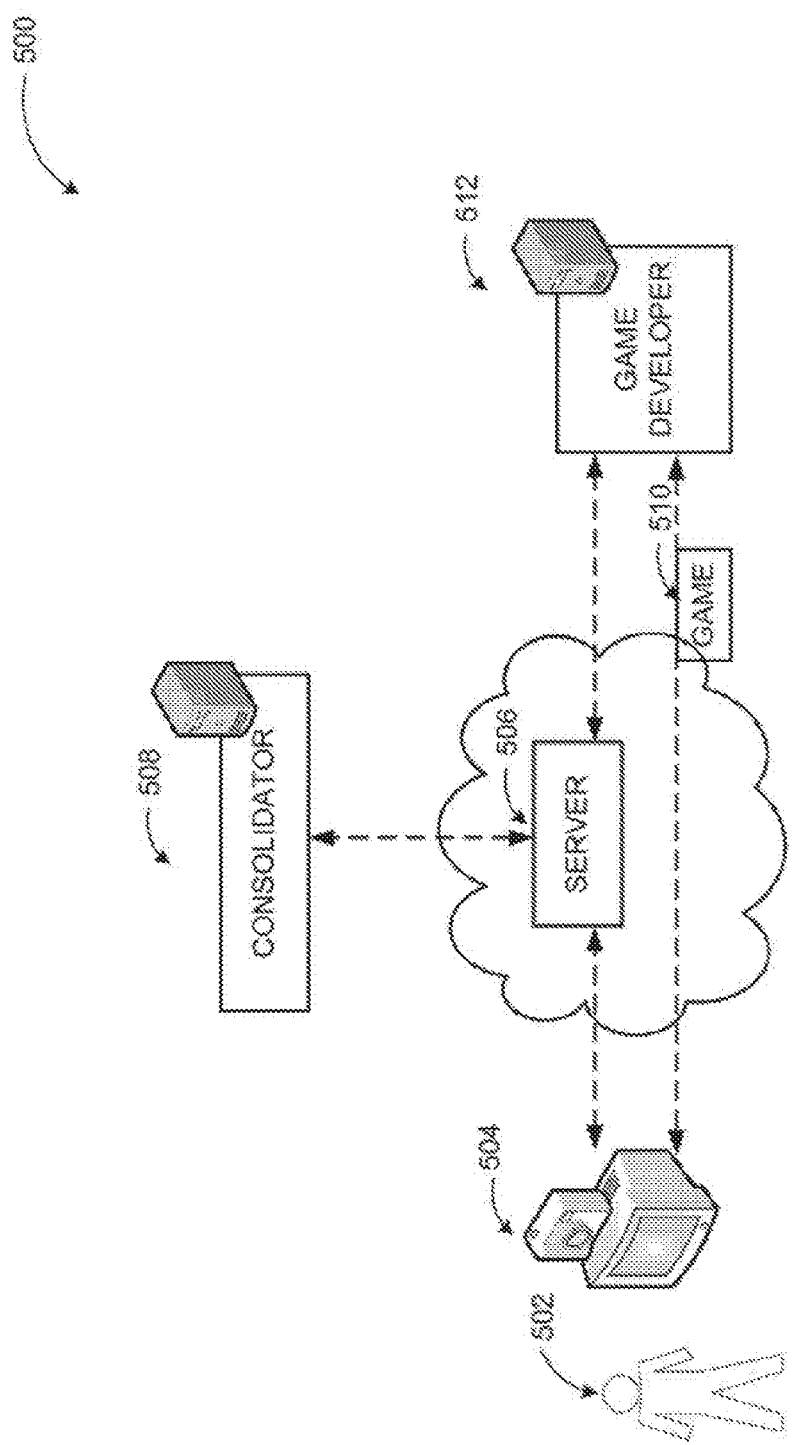
FIG. 5 illustrates an example configuration of a system providing animated character models using stored recordings of player movement interface data.

FIG. 5 illustrates an example configuration of a system 500 providing animated character models using stored recordings of player movement interface data, arranged in accordance with at least some embodiments described herein.

As shown in the system 500, a user 502 may interact with a motion capture device 504 by, for example, using gestures or other body movements. In some embodiments, the motion capture device 504 may be a public motion capture device (e.g., a video camera in a public location) or a personal motion capture device (e.g., a portable video camera). In other embodiments, the motion capture device 504 may be part of a game system, and the user 502 may play a game 510 or interact with a virtual environment by using gestures or body movements to interact with the game system. The motion capture device 504 may then capture the user's body movements and convert the captured motion into commands for the game 510 or the virtual environment.

The motion of the user 502 captured by the motion capture device 504 may be transmitted to and stored on a cloud server 506. Subsequently, the captured motion may be processed to generate searchable quantizations of motion, as described above in relation to FIGS. 1 and 2. The processing may be performed by the cloud server 506, by a consolidator 508, or by a combination of the two. The searchable quantizations of motion may then be stored in one or more databases located at the cloud server 506 and/or the consolidator 508.

In some embodiments, a game developer 512 may request a full-motion animation (e.g., as described in FIGS. 3 and 4) or may request short motion segments for constructing a full-motion animation from the cloud server 506. If short motion segments are requested, the cloud server 506 may search for the requested short motion segments and then send them (if found) to the game developer 512. In some embodiments, the cloud server 506 may forward the request to the consolidator 508, which may then search for the requested short motion segments. If the consolidator 508 finds the requested segments, the consolidator 508 may then forward the segments to the cloud server 506, which may then send the segments to the game developer 512.

If a full-motion animation is requested, the cloud server 506 may assemble the requested full-motion animation as described above in relation to FIG. 4 and then may provide the assembled full-motion animation to the game developer 512. In some embodiments, the cloud server 506 may forward the request to the consolidator 508, which may then assemble the requested full-motion animation as described in FIG. 4. The consolidator 508 may then forward the assembled fill-motion animation to the game developer 512 through the cloud server 506. In other embodiments, the cloud server 506 and the consolidator 508 may share the animation assembly process.

In some embodiments, specific short motion segments for capture may be requested by the game developer 512, the consolidator 508, an operator of the server 506, or another entity. For example, if short motion segments that match certain constraints are often requested, but lacking in the database (or only a few examples are available), the game 510 may be configured to request that the user 502 perform those short motion segments. By doing so, a library of transitions into and out of commonly-requested positions may be constructed. In some embodiments, the game 510 may explicitly request the user 502 to perform those short motion segments (e.g., via an on-screen or audio prompt). In other embodiments, the game 510 may instead integrate the short motion segments into gameplay, for example challenging the user 502 to perform the segments as part of the game 510. The game 510 may also be configured to provide incentives to the user 502 to perform the short motion segments. The incentives may include financial incentives (e.g., real or virtual currency), in-game incentives (e.g., new characters, new character skins or outfits, customizations, score gains, treasure, downloadable content, etc.), or acknowledgements (e.g., showing a congratulatory message, showing a real or virtual name of the user 502 to other users, or any other suitable acknowledgement).

Figure 6:
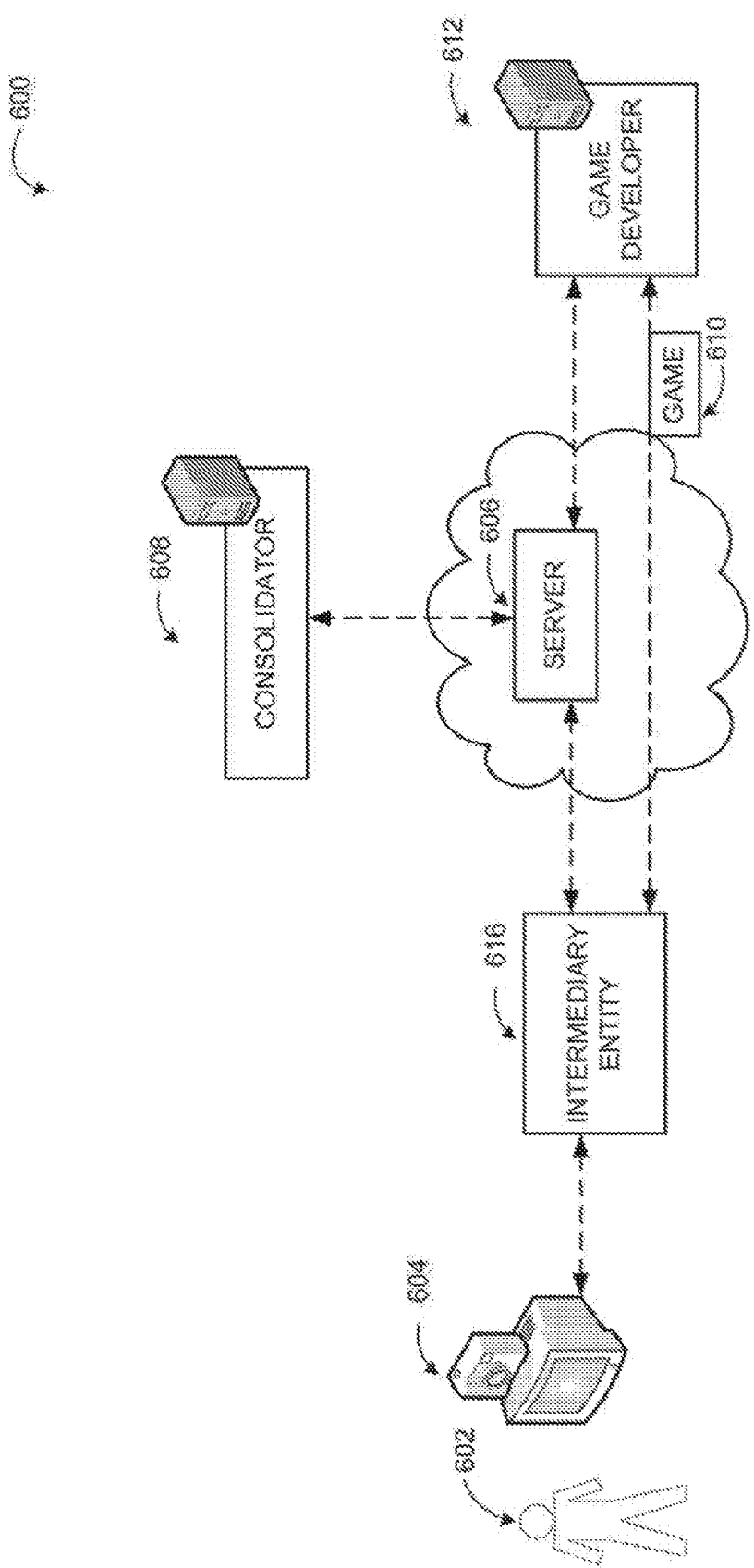
FIG. 6 illustrates another example configuration of a system providing animated character models using stored recordings of player movement interface data.

FIG. 6 illustrates another example configuration of a system 600 providing animated character models using stored recordings of player movement interface data, arranged in accordance with at least some embodiments described herein.

As shown in the system 600, a user 602 (similar to the user 502 in FIG. 5) may interact with a motion capture device 604 (similar to the motion capture device 504 in FIG. 5). The system depicted in FIG. 6 may also include a cloud server 606, a consolidator 608, a game 610, and a game developer 612, all of which may be similar to their counterparts in FIG. 5 (i.e., the cloud server 506, the consolidator 508, the game 510, and the game developer 512). In contrast to the system 500 depicted in FIG. 5, the system 600 may also include an intermediary entity 616 that resides between the motion capture device 604 and the cloud server 606/game 610. The intermediary entity 616 may receive short motion sequence requests from the cloud server 606, the consolidator 608, the game 610, and/or the game developer 612. In some embodiments, the intermediary entity 616 may pass the requests on to the motion capture device 604 and the user 602, either directly or indirectly. For example, the intermediary entity 616 may process the requests to be compatible with the motion capture device 604 and/or a user interface device associated with the motion capture device 604. The intermediary entity 616 may also collect short motion sequences captured by the motion capture device 604 and process the sequences at least partially before passing them on.

Figure 7:
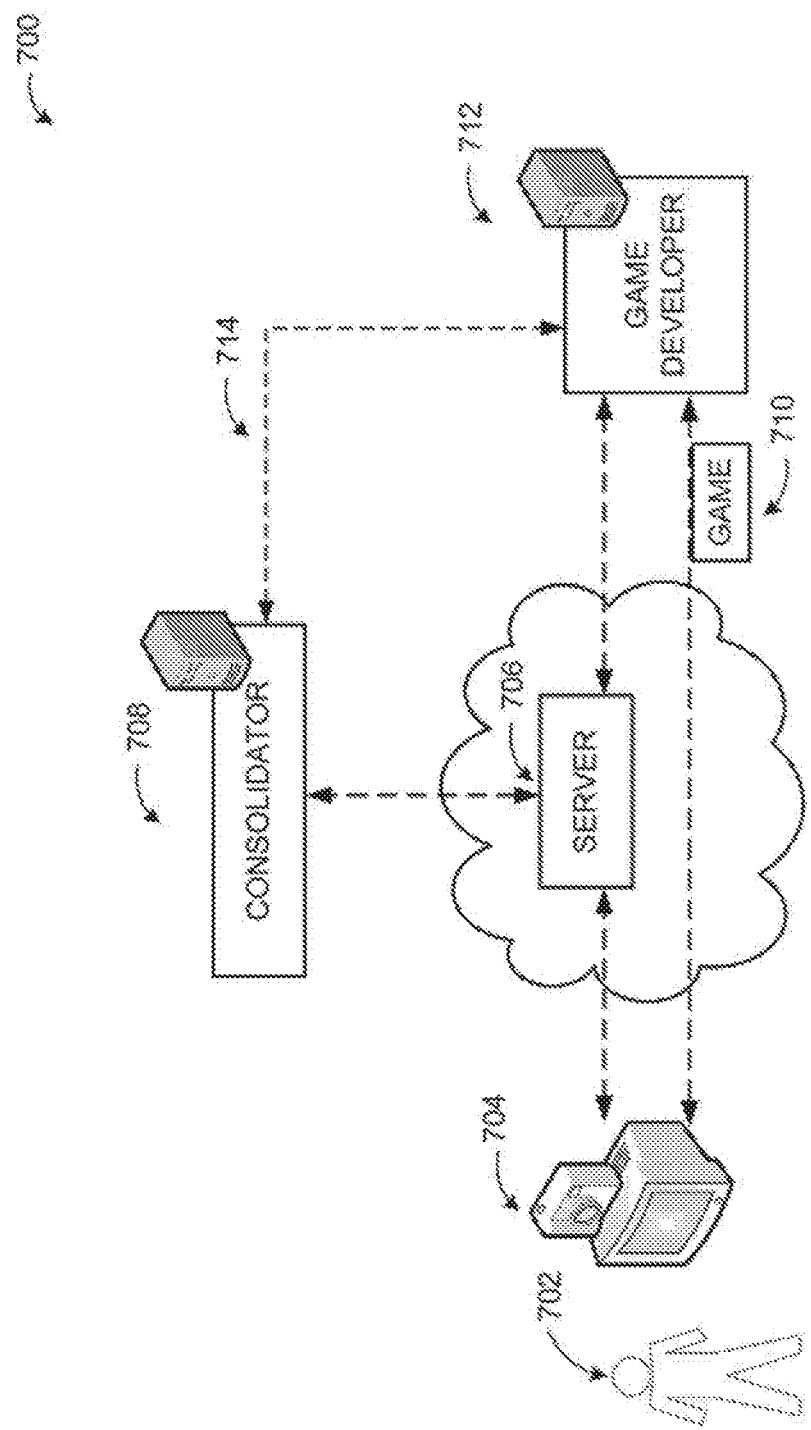
FIG. 7 illustrates a further example configuration of a system providing animated character models using stored recordings of player movement interface data.

FIG. 7 illustrates a further example configuration of a system 700 providing animated character models using stored recordings of player movement interface data, arranged in accordance with at least some embodiments described herein.

The system 700 includes a user 702, a motion capture device 704, a cloud server 706, a consolidator 708, a game 710, and a game developer 712. These elements of the system 700 may be similar to their counterparts in the system 500 of FIG. 5 (i.e., the user 502, and the motion capture device 504, the cloud server 506, the consolidator 508, the game 510, and the game developer 512). In contrast to the system 500 depicted in FIG. 5, the game developer 712 in FIG. 7 may be able to directly request assembled full-motion animations and/or short motion sequences from the consolidator 708 via a communication path 714. As a result, traffic between the game developer 712 and the consolidator 708 may not need to be routed through the cloud server 706.

Figure 8:
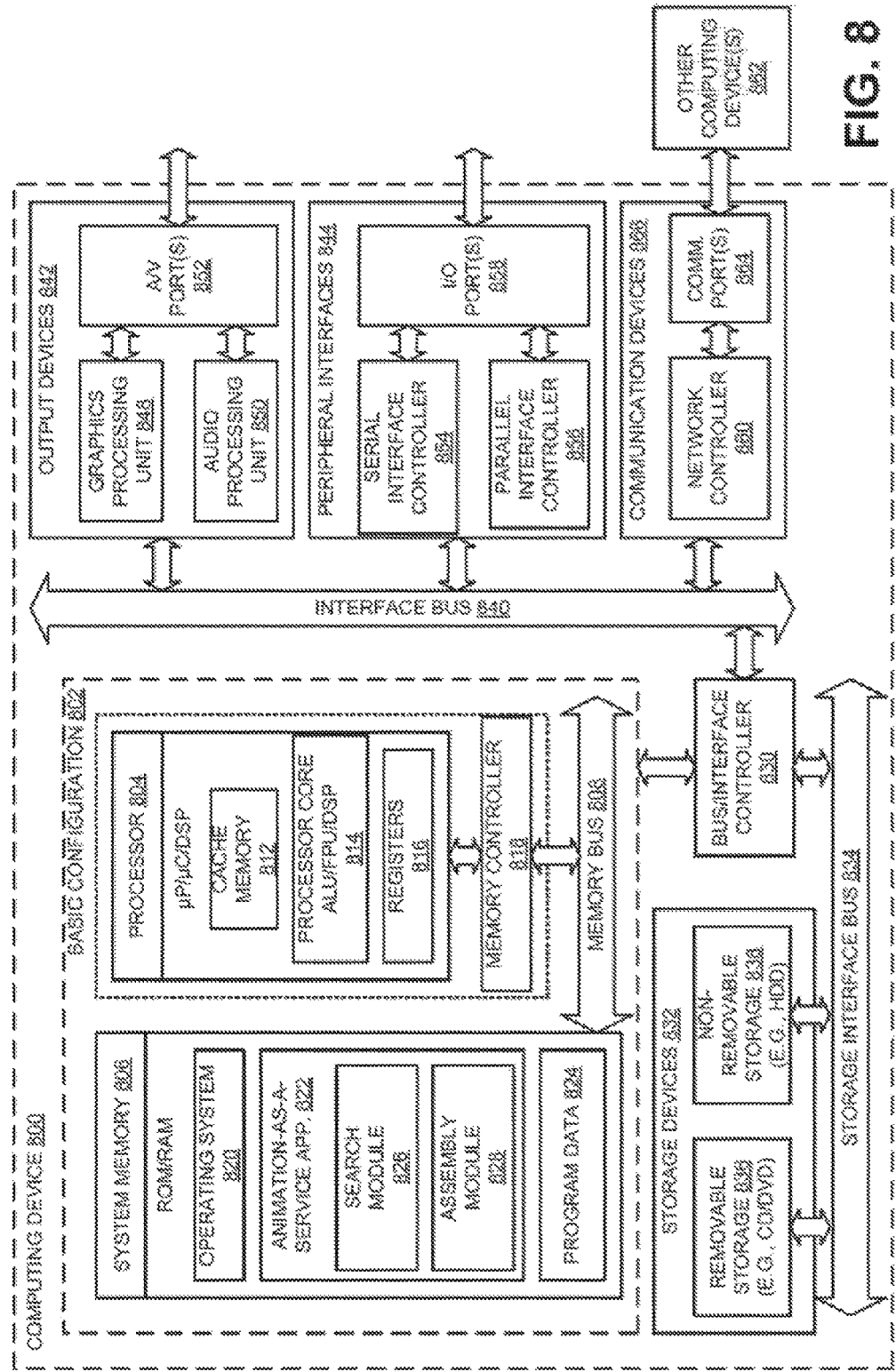
FIG. 8 illustrates a general purpose computing device, which may be used to control a system for providing animated character models using stored recordings of player movement interface data.

FIG. 8 illustrates a general purpose computing device, which may be used to control a system for providing animated character models using stored recordings of player movement interface data, arranged in accordance with at least some embodiments described herein.

For example, a computing device 800 may be used to control a system for providing animated character models using stored recordings of player movement interface data as described herein. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (μP), a microcontroller (μC), a digital signal processor (DSP), or any combination thereof. The processor 804 may include one more levels of caching, such as a cache memory 812, a processor core 814, and registers 816. The example processor core 814 may include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, an animation-as-a-service (AaaS) application 822, and program data 824. The AaaS application 822 may include a search module 826 for searching short motion sequences and an assembly module 828 for assembling full-motion animations from short motion sequences as described herein.

The computing device 800 may have additional features or functionality, and add additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (e.g., one or more output devices 842, one or more peripheral interfaces 814, and one or more communication devices 866) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more 110 ports 858. An example communication device 866 includes a network controller 860, which may be arranged to facilitate communications with one or more other computing devices 862 over a network communication link via one or more communication ports 864. The one or more other computing devices 862 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods for providing animated character models using stored recordings of player movement interface data. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 9:
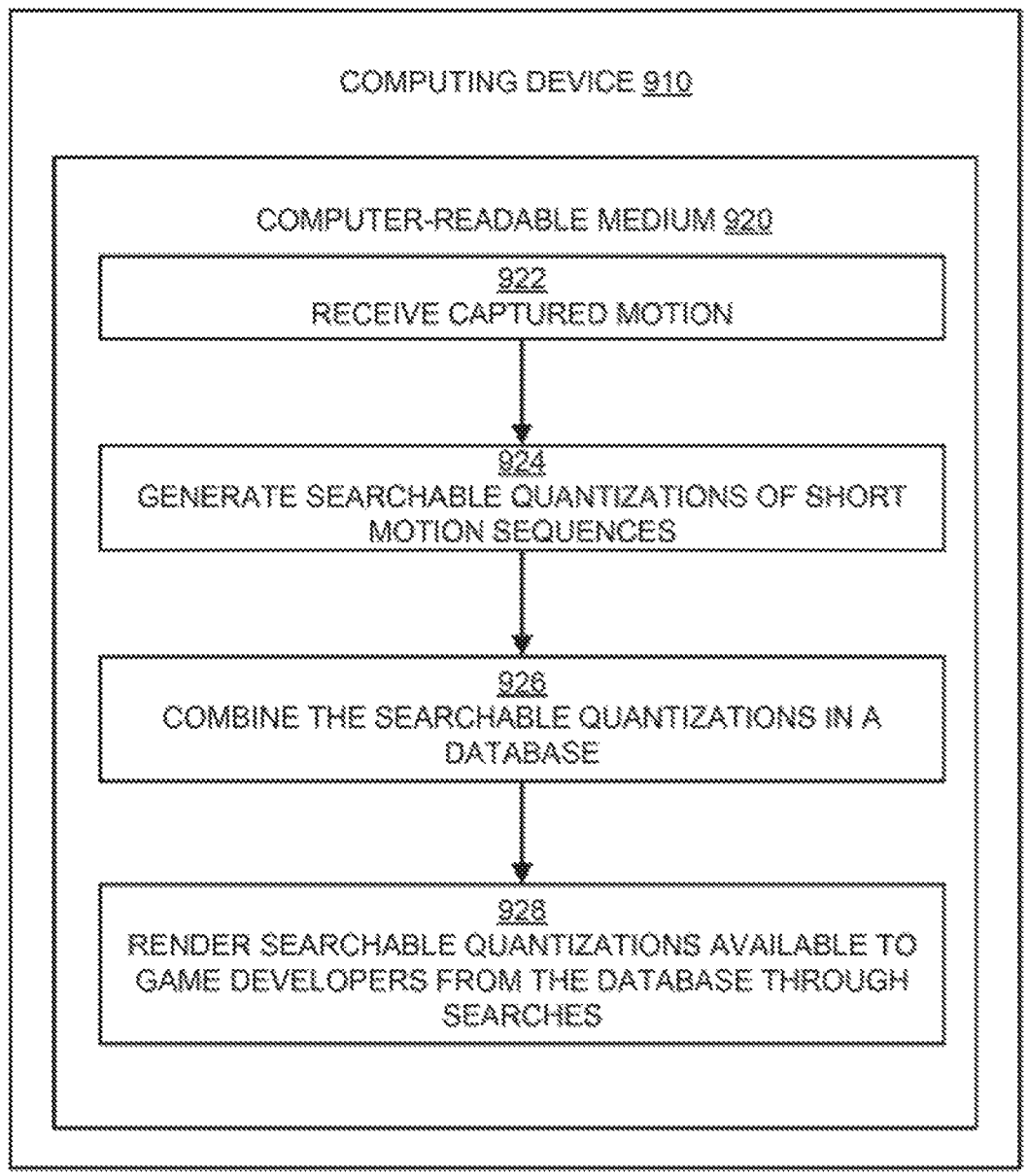
FIG. 9 is a flow diagram illustrating an example method for generating searchable short motion sequences based on motions captured from multiple users that may be performed by a computing device such as the computing device in FIG. 8.

FIG. 9 is a flow diagram illustrating an example method for generating searchable short motion sequences based on motions raptured from multiple users that may be performed by a computing device such as the computing device in FIG. 8, arranged in accordance with at least some embodiments described herein.

Example methods may include one or more operations, functions or actions as illustrated by one or more of blocks 922, 924, 926, and/or 928, and may in some embodiments be performed by a computing device such as the computing device 800 in FIG. 8. The operations described in the blocks 922-928 may also be stored as computer-executable instructions in a computer-readable medium such as a computer-readable medium 920 of a computing device 910.

An example process for generating searchable short motion sequences may begin with block 922, "RECEIVE CAPTURED MOTION", where captured motion (e.g., motion captured as described in FIG. 1) may be received by an entity (e.g., a consolidator or a motion capture device controller), for example as described in block 202 in FIG. 2.

Block 922 may be followed by block 924, "GENERATE SEARCHABLE QUANTIZATIONS OF SHORT MOTION SEQUENCES", where searchable quantizations of short motion sequences may be generated from the captured motion, for example as described above in relation to block 204 in FIG. 2.

Block 924 may be followed by block 926, "COMBINE THE SEARCHABLE QUANTIZATIONS IN A DATABASE", where the searchable quantizations may be combined into a database of motion captures, for example as described above in relation to block 206 in FIG. 2.

Finally, block 926 may be followed by block 928. "RENDER SEARCHABLE QUANTIZATIONS AVAILABLE TO GAME DEVELOPERS FROM THE DATABASE THROUGH SEARCHES", where the searchable quantizations in the database may be made available such that game developers (e.g., the game developers 512, 612, and 712 in FIGS. 5, 6, and 7) may find particular, desired quantizations via searches, as described above in relation to FIG. 4. The searchable quantizations may also be made available to other interested entities, such as film or television producers or any other entity using motion capture or animation. The searches may be unidirectional or bidirectional.

Figure 10:
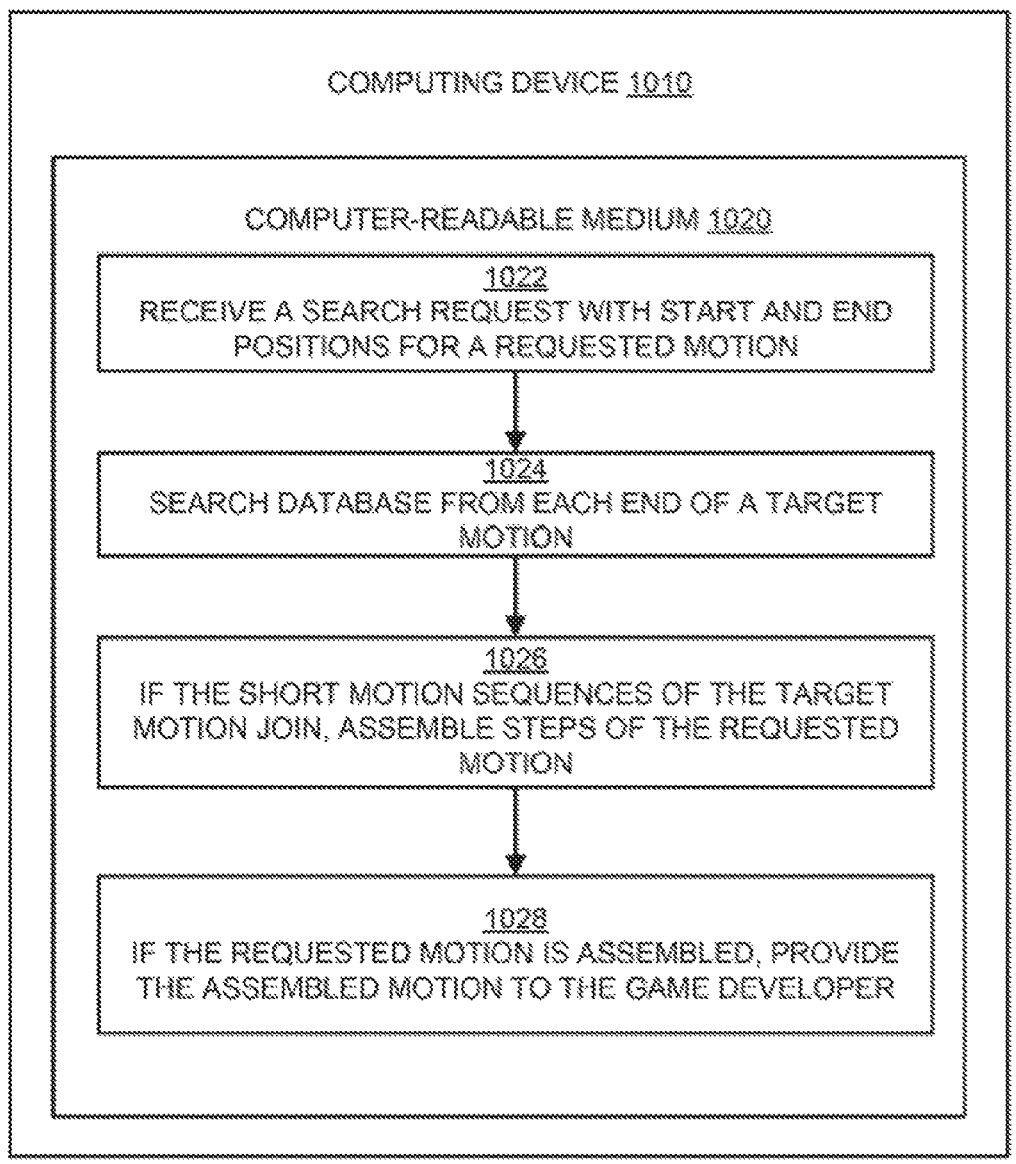
FIG. 10 is a flow diagram illustrating an example method for providing assembled motion segments from searchable quantizations of short motion sequences derived from motions captured from multiple users that may be performed by a computing device such as the computing device in FIG. 8.

FIG. 10 is a flow diagram illustrating an example method for providing assembled motion segments from searchable quantizations of short motion sequences derived from motions captured from multiple users that may be performed by a computing device such as the computing device in FIG. 8, arranged in accordance with at least some embodiments described herein.

Example methods may include one or more operations, functions or actions as illustrated by one or more of blocks 1022, 1024, 1026, and/or 1028, and may in some embodiments be performed by a computing device such as the computing device 800 in FIG. 8. The operations described in the blocks 1022-1028 may also be stored as computer-executable instructions in a computer-readable medium such as a computer-readable medium 1020 of a computing device 1010.

An example process for providing assembled motion segments may begin with block 1022, "RECEIVE A SEARCH REQUEST WITH START AND END POSITIONS FOR A REQUESTED MOTION", where a request for a full-motion animation with a particular start position and a particular end position may be received, as described in FIG. 3 and block 402 in FIG. 4. The request may be received by an entity, such as a consolidator (e.g., the consolidator 508 in FIG. 5), the operator of a cloud server (e.g., the cloud server 506 in FIG. 5), or any other entity having access to a database of short motion segments. In some embodiments, the request may include other information about the desired full-motion animation as described above, such as a desired time duration, desired (or undesired) orientations or trajectories, or any other suitable constraint information.

Block 1022 may be followed by block 1024, "SEARCH DATABASE FROM EACH END OF A TARGET MOTION", where the start position and the end position of a target motion may be used to search a database, as described above in relation to FIG. 4. In some embodiments, the start and end positions supplied in block 1022 may be used initially, with other start and end positions used for subsequent searches, as described in relation to block 416 of FIG. 4.

Block 1024 may be followed by block 1026, "IF THE SHORT MOTION SEQUENCES OF THE TARGET MOTION JOIN, ASSEMBLE STEPS OF THE REQUESTED MOTION", where short motion sequences found in block 1024 may be assembled together if they join, as described in blocks 414 and 418 of FIG. 4.

Finally, block 1026 may be followed by block 1028, "IF THE REQUESTED MOTION IS ASSEMBLED, PROVIDE THE ASSEMBLED MOTION TO THE GAME DEVELOPER", where the assembled full-motion animation may be provided to the game developer or other requesting entity, as described in relation to FIGS. 3 and 4. In some embodiments, the assembled full-motion animation may also be smoothed and mapped to a target character as described in block 406 in FIG. 4, either before or after being provided to the requester.

Figure 11:
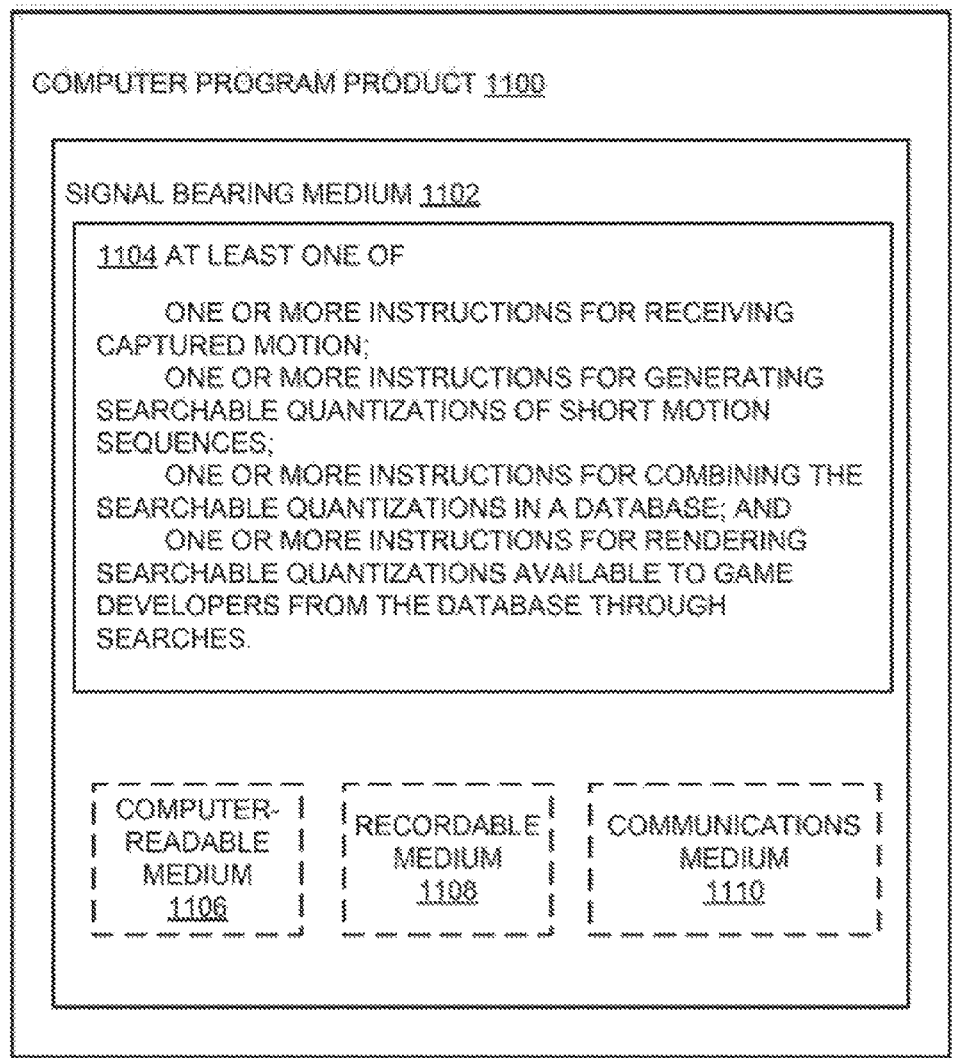

FIGS. 11 and 12 illustrate block diagrams of example computer program products, arranged in accordance with at least some embodiments described herein.

In some examples, as shown in FIG. 11, the computer program product 1100 may include a signal bearing medium 1102 that may also include one or more machine readable instructions 1104 that, when executed by, for example, a processor, may provide the functionality described herein. Thus, for example, referring to the processor 804 in FIG. 8, the AaaS application 822 may undertake one or more of the tasks shown in FIG. 11 in response to the instructions 1104 conveyed to the processor 804 by the signal bearing medium 1102 to perform actions associated with generating searchable short motion sequences based on motions, captured from multiple users as described herein. Some of those instructions may include, for example, receiving captured motion, generating searchable quantizations of short motion sequences, combining the searchable quantizations in a database, and/or rendering searchable quantizations available to game developers from the database through searches, according to some embodiments described herein.

In some examples, as shown in FIG. 12, the computer program product 1200 may include a signal bearing medium 1202 that may also include one or more machine readable instructions 1204 that, when executed by, for example, a processor, may provide the functionality described herein. Thus, for example, referring to the processor 804 in FIG. 8, the AaaS application 822 may undertake one or more of the tasks shown in FIG. 12 in response to the instructions 1204 conveyed to the processor 804 by the signal bearing medium 1202 to perform actions associated with providing assembled motion segments as described herein. Some of those instructions may include, for example, receiving a search request with start and end positions for a requested motion, searching a database from each end of a target motion, assembling steps of the requested motion if the short motion sequences of the target motion join, and/or providing the assembled motion to the game developer if the requested motion is assembled, according to some embodiments described herein.

In some implementations, the signal hearing mediums 1102 and 1202 depicted in FIGS. 11 and 12 may encompass computer-readable mediums 1106 and 1206, such as, but not limited to, a hard disk drive, a solid state drive, a Compact Disc (CD), a Digital Versatile Disk (DVD), a digital tape, memory, etc. In some implementations, the signal bearing mediums 1102 and 1202 may encompass recordable mediums 1108 and 1208, such as, but not limited to, memory, read/write (R/W) CDs, R/W DVDs, etc. In some implementations, the signal bearing mediums 1102 and 1202 may encompass communications mediums 1110 and 1210, such as, but not limited to, a digital and/or an analog communication medium (e.g., a fiber optic cable, a waveguide, a wired communications link, a wireless communication link, etc.). Thus, for example, the computer program products 1100 and 1200 may be conveyed to one or more modules of the instructions 1104 and 1204 by an RF signal bearing medium, where the signal bearing mediums 1102 and 1202 are conveyed by the wireless communications mediums 1110 and 1210 (e.g., a wireless communications medium conforming with the IEEE 802.11 standard).

According to some examples, a system for providing searchable short motion sequences to game developers includes a communication module and a server. The communication module may be configured to receive captured motion of multiple users through one or more capture devices. The server may be configured to generate searchable quantizations of short motion sequences from the captured motion, combine the searchable quantizations in a database, and render the searchable quantizations available to game developers from the database through searches for building assembled motion.

According to some embodiments, the server may be further configured to process the captured motion data into segments of distinct motion. The searchable quantizations of short motion sequences may be generated from the segments of distinct motion based on an orientation, a position, a timing, a velocity, and/or an acceleration value. The motion may be captured in a public or a private setting, and/or may be captured through a public video capture device, a personal video capture device, or a motion sensor associated with a gaming system. The server may be further configured to remove identifying characteristics of the users, from the captured motion.

According to other embodiments, the searchable quantizations may be rendered searchable by a pose, an action, and/or character features. The character features may include a size, proportions, and/or weight. The server may be further configured to filter undesirable motion segments from the captured motion. The capture device(s) may include a motion sensor associated with a gaming system, and the system may be configured to provide an incentive to user(s) of the gaming system to participate in collection of the captured motion. The incentive may include a monetary incentive, a game incentive, and/or an acknowledgment. The server may further configured to challenge the users to match a character pose on screen to allow build-up of a library of transitions into and out of commonly-requested positions in a game context. The server may also be further configured to identify action(s) lacking from the captured motion database and request the users to provide the identified lacking action. The system may be a game developer, a controller of a capture system that controls the capture device, or a consolidator independent of the capture system and the game developer.

According to other examples, a method for providing searchable short motion sequences to game developers includes receiving captured motion of multiple users through one or more capture devices, generating searchable quantizations of short motion sequences from the captured motion, combining the searchable quantizations in a database, and rendering the searchable quantizations available to game developers from the database through searches for building assembled motion.

According to some embodiments, the method may further include processing the captured motion data into segments of distinct motion and/or generating the searchable quantizations of short motion sequences from the segments of distinct motion based on an orientation, a position, a timing, a velocity, and/or an acceleration value. The motion may be captured in a public or a private setting, and/or may be captured through a public video capture device, a personal video capture device, or a motion sensor associated with a gaming system. The method may further include removing identifying characteristics of the users from the captured motion.

According to other embodiments, the method may further include rendering the searchable quantizations searchable by a pose, an action, and/or character features. The character features may include a size, proportions, and/or weight. The method may further include filtering undesirable motion segments from the captured motion. The capture device(s) may include a motion sensor associated with a gaming system, and the method may further include providing an incentive to user(s) of the gaming system to participate in collection of the captured motion. The incentive may include a monetary incentive, a game incentive, and/or acknowledgement. The method may further include challenging the users to match a character pose on screen to allow build-up of a library of transitions into and out of commonly-requested positions in a game context. The method may also include identifying action(s) lacking from the captured motion database and requesting the users to provide the identified lacking action.

According to further examples, a system for providing assembled motion segments from searchable quantizations of short motion sequences derived from captured motions may include a communication module, a database, and a server. The communication module may be configured to receive search requests from one or more requesters and provide the assembled motion segments to the requesters. The database may be configured to store the quantizations of short motion sequences derived from captured motions of multiple users. The server may be configured to receive start and end positions for a requested motion, search the database from each end of a target motion, assemble steps of the requested motion if the short motion sequences of the target motion join, otherwise search for new points within the target motion, and provide the assembled motion to a requester if the requested motion is assembled.

According to some embodiments, the server may be further configured to perform the search in a multiple path, multiple iteration manner, to employ motion retargeting to match search results to a game model, to smooth the assembled motion and map to a target game character, to animate the target game character based on the assembled motion, and/or to start searching for the end position in any part of the database except a beginning of a motion record and the start position in any part of the database except an end of a motion record. The searchable quantizations of short motion sequences may be generated from segments of distinct motion based on one or more variables including an orientation, a position, a timing, a velocity, and/or an acceleration value, and a search request may include a preference for at least one of the variables.

According to other embodiments, the server may be further configured to filter the searchable quantizations based on one or more character features. The character features may include a size, proportions, and/or a weight. The system may be a game developer, a controller of a capture system controlling the capture device, or a consolidator independent of the capture system and the game developer.

According to yet further examples, a method for providing assembled motion segments from searchable quantizations of short motion sequences derived from captured motions may include receiving a search request from a requester, where the search request includes start and end positions for a requested motion, searching a database from each end of a target motion, where the database is configured to store the quantizations of short motion sequences derived from captured motions of multiple users, assembling steps of the requested motion if the short motion sequences stale target motion join, otherwise searching for new points within the target motion, and providing the assembled motion to a requester if the requested motion is assembled.

According to some embodiments, the method may further include performing the search in a multiple path, multiple iteration manner, employing motion retargeting to match search results to a game model, smoothing the assembled motion and mapping to a target game character, animating the target game character based on the assembled motion, and/or starting the search for the end position in any part of the database except a beginning of a motion record and the start position in any part of the database except an end of a motion record. The searchable quantizations of short motion sequences may be generated from segments of distinct motion based on one or more variables including an orientation, a position, a timing, a velocity, and/or an acceleration value, and the search request may include a preference for at least one of the variables.

According to other embodiments, the method may further include filtering the searchable quantizations based on one or more character features. The character features may include a size, proportions, and/or a weight.

According to some examples, a computer readable medium may store instructions for providing searchable short motion sequences to game developers. The instructions may include receiving captured motion of multiple users through one or more capture devices, generating searchable quantizations of short motion sequences from the captured motion, combining the searchable quantizations in a database, and rendering the searchable quantizations available to game developers from the database through searches for building assembled motion.

According to some embodiments, the instructions may further include processing the captured motion data into segments of distinct motion and/or generating the searchable quantizations of short motion sequences from the segments of distinct motion based on an orientation, a position, a timing, a velocity, and/or an acceleration value. The motion may be captured in a public or a private setting, and/or may be captured through a public video capture device, a personal video capture device, or a motion sensor associated with a gaming system. The instructions may further include removing identifying characteristics of the users from the captured motion.

According to other embodiments, the instructions may further include rendering the searchable quantizations searchable by a pose, an action, and or character features. The character features may include a size, proportions, and/or weight. The instructions may further include filtering undesirable motion segments from the captured motion. The capture device(s) may include a motion sensor associated with a gaining system and the instructions may further include providing an incentive to user(s) of the gaming system to participate in collection of the captured motion. The incentive may include a monetary incentive, a game incentive, and/or an acknowledgement. The instructions may further include challenging the users to match a character pose on screen to allow build-up of a library of transitions into and out of commonly-requested positions in a game context. The instructions may also include identifying action(s) lacking from the captured motion database and requesting the users to provide the identified lacking action.

According to other examples, a computer readable storage medium may store instructions for providing assembled motion segments from searchable quantizations of short motion sequences derived from captured motions. The instructions may include receiving a search request from a requester, where the search request includes start and end positions for a requested motion, searching a database from each end of a target motion, where the database is configured to store the quantizations of short motion sequences derived from captured motions of multiple users, assembling steps of the requested motion if the short motion sequences of the target motion join, otherwise searching for new points within the target motion, and providing the assembled motion to a requester if the requested motion is assembled.

According to some embodiments, the instructions may further include performing the search in a multiple path, multiple iteration manner, employing motion retargeting to match search results to a game model, smoothing the assembled motion and mapping to a target game character, animating the target game character based on the assembled motion, and/or starting the search for the end position in any part of the database except a beginning of a motion record and the start position in any part of the database except an end of a motion record. The searchable quantizations of short motion sequences may be generated from segments of distinct motion based on one or more variables including an orientation, a position, a timing, a velocity, and/or an acceleration value, and the search request may include a preference for at least one of the variables.

According to other embodiments, the instructions may further include filtering the searchable quantizations based on one or more character features. The character features may include a size, proportions, and/or a weight.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably countable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system to provide an assembled motion segment from searchable quantizations of short motion sequences derived from captured motions, the system comprising:
    a database configured to store the searchable quantizations of the short motion sequences derived from the captured motions, wherein the captured motions are that of one or more entities that are capable of movement;
    a server operatively coupled to the database and configured to:
        identify a start position and an end position of a requested motion;
        search the database for two or more short motion sequences based on the start position and based on the end position of the requested motion;
        in response to a determination that the two or more short motion sequences join together, assemble the two or more short motion sequences to produce the requested motion; and
        in response to a determination that the two or more short motion sequences are disjointed:
            set at least one new start position and at least one new end position based on the two or more short motion sequences;
            search the database for at least one other short motion sequence based on the at last one new start position and based on the at least one new end position; and
            assemble one or more of the at least one other short motion sequence and the two or more short motion sequences to produce the requested motion; and
    a communication device coupled to the server and configured to:
        receive a search request that specifies the requested motion; and
        transmit the assembled motion segment in response to the search request, wherein the assembled motion segment includes the requested motion that was produced by the server.

2. The system of claim 1, wherein to produce the requested motion, the server is further configured to smooth the assembled short motion sequences, map the assembled short motion sequences to a target, game character, and provide the assembled short motion sequences as the assembled motion segment to a requester via the communication device.

3. The system of claim 2, wherein the server is further configured to animate the target game character based on the assembled motion sequences.

4. The system of claim 1, wherein the server is further configured to employ motion retargeting to match search results to a game model.

5. The system of claim 1, wherein the server is configured to:
    start the search based on the end position in any part of the database except at a beginning of the short motion sequences; and
    start the search based on the start position in any part of the database except at an end of the short motion sequences.

6. The system of claim 1, wherein the searchable quantizations of the short motion sequences are generated from segments of distinct motion based on one or more variables including an orientation, a position, a timing, a velocity, and/or an acceleration value, and wherein the search request includes a preference for at least one of the one or more variables.

7. The system of claim 1, wherein the captured motions of the one or more entities comprise captured motions of one or more of an animal and a robot.

8. A method to provide an assembled motion segment from searchable quantizations of short motion sequences derived from captured motions, the method comprising:
    receiving a search request, wherein the search request includes a start position and an end position of a requested motion;
    searching a database for two or more short motion sequences based on the start position and based on the end position of the requested motion, wherein the database is configured to store the searchable quantizations of the short motion sequences derived from the captured motions, wherein the captured motions are that of one or more entities capable of movement;
    in response to a determination that the two or more short motion sequences join together, assembling the two or more short motion sequences to produce the requested motion; and
    in response to a determination that the two or more short motion sequences are disjointed:
        setting at least one new start position and at least one new end position based on the two or more short motion sequences;
        searching the database for at least one other short motion sequence based on the at least one new start position and based on the at least one new end position; and
        assembling one or more of the at least one other short motion sequence and the two or more short motion sequences to produce the requested motion.

9. The method of claim 8, further comprising smoothing the assembled short motion sequences and mapping the assembled short motion sequences to a target game character.

10. The method of claim 9, further comprising animating the target game character based on the assembled short motion sequences.

11. The method of claim 8, further comprising employing motion retargeting to match search results to a game model.

12. The method of claim 8, further comprising:
    starting the search based on the end position in any part of the database except at a beginning of the short motion sequences; and
    starting the search based on the start position in any part of the database except at an end of the short motion sequences.

13. The method of claim 8, further comprising generating the searchable quantizations of the short motion sequences from segments of distinct motion based on one or more variables including an orientation, a position, a timing, a velocity, and/or an acceleration value, wherein receiving the search request includes receiving a preference for at least one of the variables.

14. The method of claim 8, further comprising filtering the searchable quantizations based on one or more features of a target game character.

15. A cloud-based server configured to provide an assembled motion segment from searchable quantizations of short motion sequences derived from captured motions, the cloud-based server comprising:
a memory configured to store instructions;
a processor coupled to the memory and configured to execute, in conjunction with the stored instructions, an animation-as-a-service (AaaS) application, the AaaS application configured to:
identify a start position and an end position of a requested motion;
search a database for two or more short motion sequences based on the start position and based on the end position of the requested motion;
in response to a determination that the two or more short motion sequences join together, assemble the two or more short motion sequences to produce the requested motion; and
in response to a determination that the two or more short motion sequences are disjointed:
set at least one new start position and at least one new end position based on the two or more motion sequences;
search the database for at least one other short motion sequence based on the at least one new start position and based on the at least one new end position; and
assemble one or more of the at least one other short motion sequence and the two or more short motion sequences to produce the requested motion.

16. The cloud-based server of claim 15, wherein to produce the requested motion, the AaaS application is further configured to smooth the assembled short motion sequences and map the assembled short motion sequences to a target game character.

17. The cloud-based server of claim 16, wherein the AaaS application is further configured to animate the target game character based on the assembled short motion sequences.

18. The cloud-based server of claim 15, wherein the AaaS application is configured to:
start the search based on the end position in any part of the database except at a beginning of the short motion sequences; and
start the search based on the start position in any part of the database except at an end of the short motion sequences.

19. A non-transitory computer-readable storage medium having instructions stored thereon, which in response to execution by a processor, provide assembled motion segments from searchable quantizations of short motion sequences derived from captured motions the instructions being executable to perform or control performance of operations to:
identify a start position and an end position of a requested motion that is specified in a search request;
search a database for two or more short motion sequences based on the start position and based on the end position of the requested motion, wherein the database is configured to store the searchable quantizations of the short motion sequences derived from captured motions, and wherein the captured motions are that of one or more entities that are capable of movement;
in response to a determination that the two or more short motion sequences join together, assemble the two or more short motion sequences to produce the requested motion; and
in response to a determination that the two or more short motion sequences are disjointed:
set at least one new start position and at least one new end position based on the two or more short motion sequences;
search the database for at least one other short motion sequence based on the at least one new start position and based on the at least one new end position; and
assemble one or more of the at least one other short motion sequence and the two or more short motion sequences to produce the requested motion.

20. The non-transitory computer-readable storage medium of claim 19, wherein the instructions are executable to perform or control performance of operations to:
start the search based on the end position in any part of the database except at a beginning of the short motion sequences; and
start the search for the start position in any part of the database except at an end of the short motion sequences.

* * * * *

UNITED STATES PATENT AND TRADEMARK OFFICE
CERTIFICATE OF CORRECTION

| | |
|---|---|
| PATENT NO. | : 9,925,461 B2 |
| APPLICATION NO. | : 15/477229 |
| DATED | : March 27, 2018 |
| INVENTOR(S) | : Kruglick |

It is certified that error appears in the above-identified patent and that said Letters Patent is hereby corrected as shown below:

In the Specification

In Column 1, Line 50, insert -- SUMMARY --, as a Heading.

In Column 1, Line 51, delete "or" and insert -- for --, therefor.

In Column 2, Line 22, delete "farther" and insert -- further --, therefor.

In Column 2, Line 42, delete "gate" and insert -- game --, therefor.

In Column 3, Line 19, delete "users:" and insert -- users; --, therefor.

In Column 7, Line 44, delete "block 418 the" and insert -- block 418, the --, therefor.

In Column 8, Line 17, delete "technique Fast" and insert -- technique (e.g., Fast --, therefor.

In Column 9, Line 15, delete "fill-motion" and insert -- full-motion --, therefor.

In Column 10, Line 14, delete "user 502, and the" and insert -- user 502, the --, therefor.

In Column 10, Line 43, delete "one more" and insert -- one or more --, therefor.

In Column 10, Line 49, delete "implementations the" and insert -- implementations, the --, therefor.

In Column 10, Line 62, delete "and add additional" and insert -- and additional --, therefor.

In Column 11, Line 29, delete "peripheral interfaces 814," and insert -- peripheral interfaces 844, --, therefor.

Signed and Sealed this
Fourteenth Day of August, 2018

Andrei Iancu
*Director of the United States Patent and Trademark Office*

CERTIFICATE OF CORRECTION (continued)
U.S. Pat. No. 9,925,461 B2

In Column 11, Lines 41-42, delete "110 ports 858." and insert -- I/O ports 858. --, therefor.

In Column 12, Line 20, delete "raptured" and insert -- captured --, therefor.

In Column 12, Line 49, delete "block 928." and insert -- block 928, --, therefor.

In Column 13, Line 64, delete "motions, captured" and insert -- motions captured --, therefor.

In Column 14, Line 24, delete "signal hearing" and insert -- signal bearing --, therefor.

In Column 14, Line 27, delete "a hard disk drive, a solid state drive," and insert -- a hard disk drive (HDD), a solid state drive (SSD), --, therefor.

In Column 14, Line 37, delete "communications link," and insert -- communication link, --, therefor.

In Column 15, Line 12, delete "may further" and insert -- may be further --, therefor.

In Column 15, Lines 53-54, delete "and/or acknowledgement." and insert -- and/or an acknowledgement. --, therefor.

In Column 16, Line 42, delete "sequences stale" and insert -- sequences of the --, therefor.

In Column 17, Line 23, delete "and or" and insert -- and/or --, therefor.

In Column 17, Line 28, delete "gaining system" and insert -- gaming system, --, therefor.

In Column 19, Lines 7-8, delete "hard disk drive," and insert -- Hard Disk Drive (HDD), --, therefor.

In Column 19, Line 12, delete "communications link," and insert -- communication link, --, therefor.

In Column 19, Lines 53-54, delete ""operably countable"," and insert -- "operably couplable", --, therefor.

In Column 20, Line 9, delete "recitation no" and insert -- recitation, no --, therefor.

In Column 20, Line 34, delete "general such" and insert -- general, such --, therefor.

In the Claims

In Column 21, Line 36, in Claim 1, delete "at last" and insert -- at least --, therefor.

In Column 21, Line 53, in Claim 2, delete "target, game" and insert -- target game --, therefor.

In Column 24, Line 8, in Claim 19, delete "motions the" and insert -- motions, the --, therefor.